United States Patent [19]

Reus

[11] Patent Number: 5,043,912
[45] Date of Patent: Aug. 27, 1991

[54] APPARATUS FOR MEASURING THE LEVEL OF THE INTERFACE BETWEEN A FIRST AND A SECOND MEDIUM IN A RESERVOIR

[75] Inventor: Henk J. W. Reus, Zevenhuizen, Netherlands

[73] Assignee: B.V. Enraf-Nonius Delft, Netherlands

[21] Appl. No.: 379,091

[22] Filed: Jul. 13, 1989

[30] Foreign Application Priority Data

Jul. 20, 1988 [NL] Netherlands .................. 8801836

[51] Int. Cl.$^5$ .............................................. G01F 23/00
[52] U.S. Cl. ................................. 364/509; 73/290 V; 340/621
[58] Field of Search .................... 73/290 R, 290 V; 340/618, 621; 364/509, 562

[56] References Cited

U.S. PATENT DOCUMENTS

| | | | |
|---|---|---|---|
| 2,682,026 | 6/1954 | Mesh et al. | 318/675 |
| 3,266,311 | 8/1966 | Andrensen et al. | 73/290 V |
| 3,744,301 | 7/1973 | Arave | 73/599 |
| 4,123,753 | 10/1978 | Gravert | 340/621 |
| 4,240,285 | 12/1980 | Langdon | 73/290 V X |
| 4,329,875 | 5/1982 | Nolting et al. | 340/621 X |
| 4,383,443 | 5/1983 | Langdon | 73/290 V |
| 4,523,465 | 6/1985 | Fasching et al. | 73/290 V |
| 4,531,405 | 7/1985 | Leister | 73/290 R X |
| 4,535,628 | 8/1985 | Hope | 340/621 X |
| 4,703,652 | 11/1987 | Itoh et al. | 340/621 X |

FOREIGN PATENT DOCUMENTS 1173364 2/1959 France .
1361052 7/1924 United Kingdom .

OTHER PUBLICATIONS

*Electronic Engineering,* Nov. 1981, vol. 53, "Vibratory Process Control Transducers", R. M. Langdon.
*Machine Design,* Oct. 1986, No. 25, "Piezoelectric Plastics Promise New Sensors", Ben H. Carlisle.
*IBM Technical Disclosure Bulletin,* Oct. 1972, vol. 15, No. 5, "Material Presence Sensor", B. S. Kudsi et al.
*Technisches Messen,* Sep. 1984, No. 9, "Data Processing in Ultrasound-Based Liquid Level-Measuring Instruments", H. Noll.

*Primary Examiner*—Parshotam S. Lall
*Assistant Examiner*—Edward R. Cosimano
*Attorney, Agent, or Firm*—Lorusso & Loud

[57] ABSTRACT

An apparatus for measuring the level of the interface between two different media in a reservoir comprises a vibratory element adapted to contact both media on all sides, and an amplifier circuit which together with the vibratory element forms an oscillator circuit in which the vibratory element is the frequency determining part. The vibratory element makes flexural vibrations at a resonance frequency. The apparatus further comprises a processing unit for measuring the momentary resonance frequency of the vibratory element and for deriving the level of the interface with respect to the vibratory element from said momentary frequency by means of the predetermined dependency of the resonance frequency on the depth of immersion of the vibratory element in the lower medium. The vibratory element is made as a plate-like element with a very small size with respect to the height of the reservoir. Further the vibratory element is connected to a positioning device controlled by the processing unit, and this positioning device is adapted to move the vibratory element along the whole height of the reservoir and to provide a position signal to the processing unit representing the height position of the vibratory element in the reservoir.

5 Claims, 3 Drawing Sheets

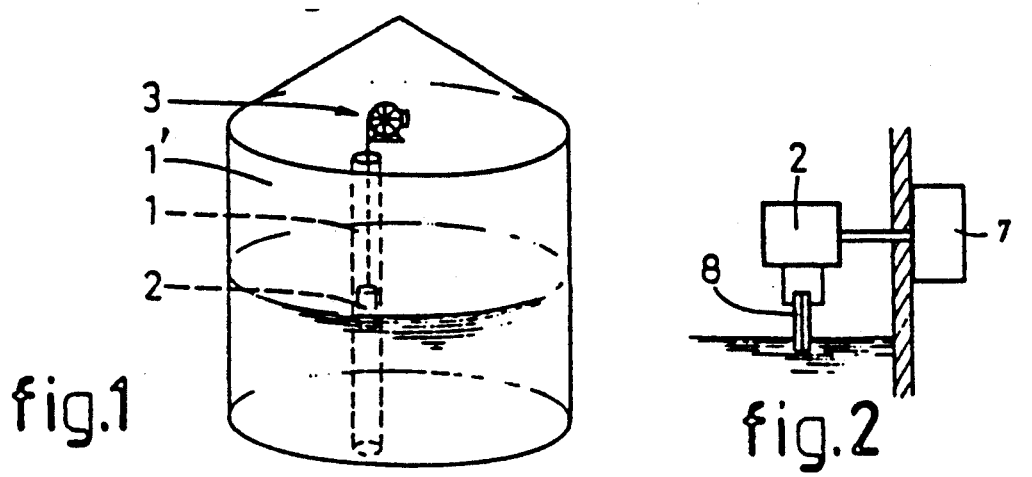
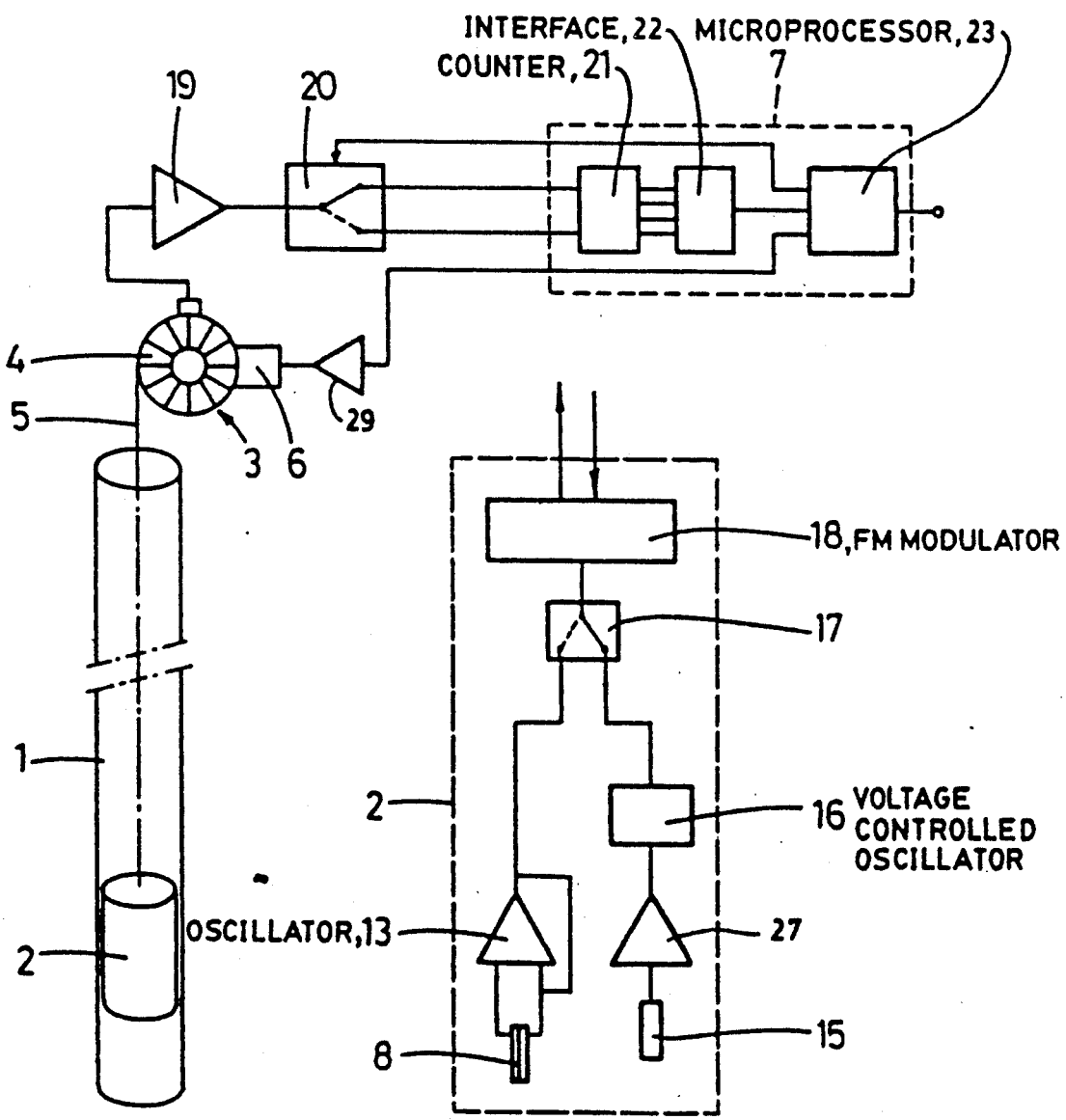

APPARATUS FOR MEASURING THE LEVEL OF THE INTERFACE BETWEEN A FIRST AND A SECOND MEDIUM IN A RESERVOIR

BACKGROUND OF THE INVENTION

The invention relates to an apparatus for measuring the level of the interface between two different media in a reservoir comprising a vibratory element adapted to contact both media on all sides, and an amplifier circuit which together with the vibratory element forms an oscillator circuit in which the vibratory element is the frequency determining part, wherein the vibratory element makes flexural vibrations at a resonance frequency, and a processing unit for measuring the momentary resonance frequency of the vibratory element and for deriving the level of the interface with respect to the vibratory element from said momentary resonance frequency by means of the predetermined dependency of the resonance frequency on the depth of immersion of the vibratory element in the lower medium.

Such an apparatus is disclosed in the article "Vibratory proces control transducers" by R. M. Langdon, Electronic Engineering, vol. 53, nr. 659, November 1981, pages 159-168. In this known apparatus the vibratory element is made as a rigid metal rod or tube with a piezo-electric transducer attached to it to generate flexural vibrations. This rod or tube extends along the whole height of the reservoir and the resonance frequency is approximately linearly dependent on the fraction of the rod or tube immersed in one of the mediums. However in view of the required length of the rod or tube, the rod or tube is vibrating at a relatively high frequency so that a number of standing waves will be present on the tube which produce vibrational nodes at intervals along its length. Such vibrational nodes have the disadvantage that the sensitivity of frequency to level change is low in the vicinity of these nodes. Compensating this sensitivity variation is rather complicated. Moreover, the accuracy of the level measurement is relatively low.

SUMMARY OF THE INVENTION

The invention aims to provide an apparatus of the above mentioned type for measuring the level of the interface between both media with a high accuracy and a high sensitivity along the whole height of the reservoir and having a relatively simple construction.

To this end the apparatus according to the invention is characterized in that the vibratory element is made as a plate-like element with a very small size with respect to the height of the reservoir and in that the vibratory element is connected to a positioning device controlled by the processing unit, said positioning device adapted to move the vibratory element along the whole height of the reservoir and to provide a position signal to the processing unit representing the height of the vibratory element in the reservoir.

In this manner the sensitivity of the apparatus will be the same along the whole height of the reservoir and the accuracy and sensitivity will be high. Further the apparatus can for example be used to measure the level of the interface between a liquid and the air or gas above this liquid. It is also possible to measure the level of the interface between two non-mixing liquids in the reservoir. The apparatus according to the invention can also be used as a level detector. For this application the positioning device may position the vibratory element at a certain height in the reservoir and as soon as during filling the reservoir the liquid contacts the vibratory element a frequency change will occur which frequency change can be determined by the processing unit. The processing unit will subsequently stop the filling operation. As soon as the filling operation has actually been stopped, the processing unit can measure and indicate the level of the liquid with high accuracy.

According to a favourable embodiment the processing unit is adapted to control the positioning device in such a manner that the vibratory element follows the interface between both media. In this manner the apparatus can be used as a liquid level gauge with high accuracy.

The apparatus according to the invention shows the advantage that the requirements for the resolution of the positioning device are relatively low because the level of the interface with respect to the vibratory element can be determined with high resolution. The positioning device should only be adapted to move the vibratory element in the height direction with high accuracy but may do so with rough steps with a maximum extent equal to the height of the vibratory element.

According to a favourable embodiment of the invention the processing unit is adapted to control the positioning device in such a manner that the vibratory element is moved into a position at the height of the interface between the first and second media, whereafter the positioning device is stopped in this position, wherein the processing unit monitors the resonance frequency of the vibratory element and provides an alarm signal if the resonance frequency indicates a fall of the interface. In this manner the reservoir can be checked on leakage with high accuracy.

In order to eliminate errors due to contamination of the vibratory element or the like, the processing unit is adapted to control the positioning device in such a manner that the vibratory element is fully in the first medium and in the second medium, respectively, wherein the processing unit measure and stores the corresponding resonance frequencies of the vibratory element in order to make recalibration possible.

In the apparatus according to the invention, temperature effects can be simply compensated by mounting a temperature sensor at the location of the vibratory element, which temperature sensor controls a temperature circuit supplying a signal depending on the temperature to the processing unit for making a temperature compensation at the level measurement of the interface.

BRIEF DESCRIPTION OF THE DRAWINGS

The invention will be further explained by reference to the drawings in which an embodiment of the apparatus according to the invention is schematically shown.

FIG. 1 schematically shows a storage tank with a standpipe wherein an embodiment of the apparatus according to the invention is provided.

FIG. 2 shows an alternative embodiment of the apparatus according to the invention in a simplified manner.

FIG. 3 schematically shows the apparatus of FIG. 1.

FIG. 4 shows in a more detailed manner the part of the apparatus of FIG. 1 which is inside the reservoir.

FIG. 5c shows schematically the flexural vibrations of the membrane shown in FIG. 5a.

DETAILED DESCRIPTION OF THE INVENTION

Figure 5A:
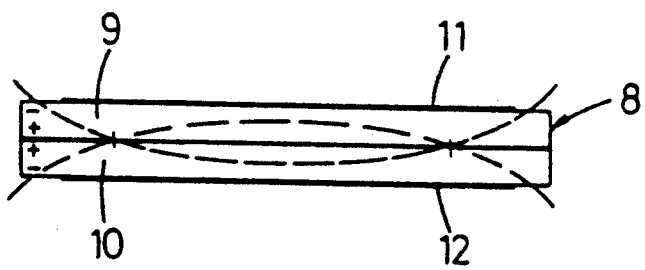
FIG. 5a shows the vibratory element of the apparatus of FIG. 1 in detail.

Referring to FIG. 1 there is schematically shown a standpipe 1 in a reservoir 1', such as for example a liquid storage tank. In the standpipe 1 shown at a larger scale in FIG. 3, and open probe 2 is movable upwards and downwards by means of a positioning device 3. The positioning device 3 comprises a schematically indicated drum 4 on which a cable 5 is wound, the probe 2 being suspended at the end of the cable 5. The drum 4 can be driven by a schematically indicated motor 6 controlled by a processing unit 7. The processing unit 7 is connected to the motor 6 through an amplifier 29. The processing unit 7 can determine the length of the cable 5 paid out.

FIG. 4 shows the part of the apparatus which is inside the probe 2. The probe 2 is provided with a vibratory membrane 8 shown in FIG. 5a in detail. In the described embodiment the membrane 8 consists of two ceramic piezo electric discs 9, 10 which for practical reasons have a diameter of 20-70 mm, for example 30 mm, and which are attached to each other with main surfaces of the same polarity. In stead of a disc-like membrane 8 it is also possible to use a membrane with a different shape, such as for example rectangular or square.

Figure 5B:
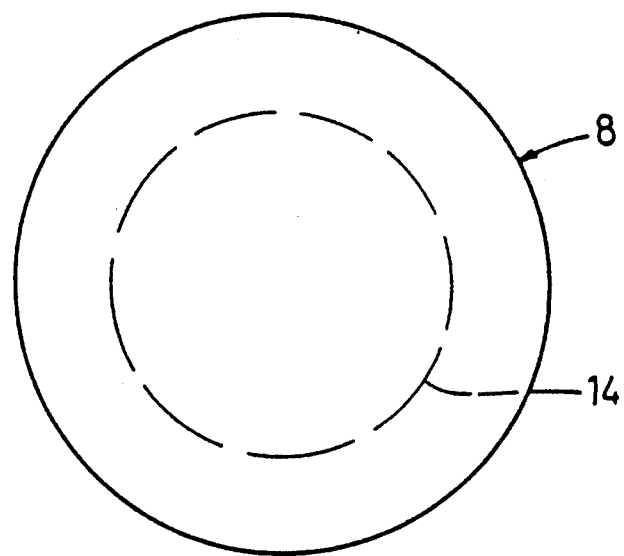
FIG. 5b shows the node line of a membrane.
Figure 5C:
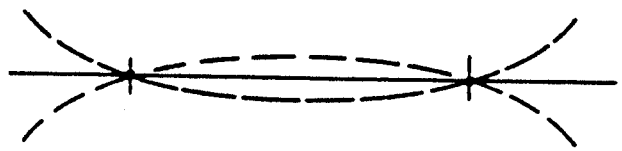
Figure 6:
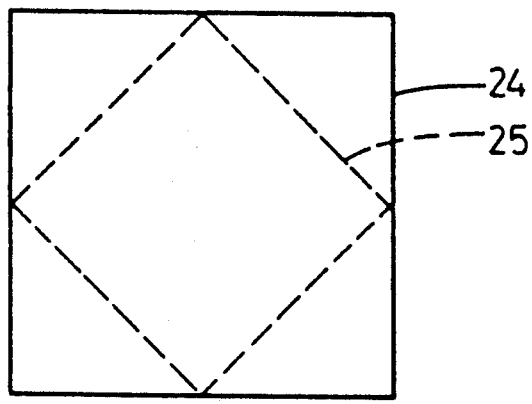
FIG. 6 shows an alternative embodiment of the vibratory element of the apparatus according to the invention.

As indicated in FIG. 5a electrodes 11, 12 are provided on the outer surfaces of the membrane 8, by means of which electrodes the membrane 8 is connected in an oscillator circuit 13. In operation the membrane 8 will make flexural vibrations as schematically indicated in FIG. 5c. In FIG. 5b the node line of the membrane 8 is indicated by a dashed line 14. The membrane 8 is suspended in a verticle position in the probe 2 in a point of this node line. By surpressing higher frequencies in the oscillator 13 in a suitable manner, the flexural vibrations of the membrane 8 are restricted to the first vibratory mode for which the indicated node line 14 applies. For such vibrations there is substantially no flow of the medium from one side of the membrane 8 to the other side. An example of a square membrane 24 is shown in FIG. 6. Such a square membrane 24 has the advantage that in the preferred low vibratory mode the suspension in the probe 2 is simple as the node line 25 intersects the middle of the outer sides of the membrane so that a connection to the outer side of the membrane 24 can be made.

It is possible to provide a temperature sensor 15, for example an NTC-resistor, in the probe 2 for controlling a voltage controlled oscillator 16. The temperature sensor 15 may be connected to the oscillator 16 through an amplifier 27. The frequencies of both oscillators 13 and 16 are supplied to a FM-modulator 18 through a multiplexer 17. The FM-modulator 18 supplies a signal to an amplifier 19 located outside the reservoir 1' through the cable 5, for example. The output signal of the amplifier 19 is supplied to the processing unit 7 through a demodulator/demultiplexer 20.

The processing unit 7 comprises a counter 21 for determining the frequencies received from the demodulator 20, an interface 22 and a microprocessor 23. Other typical parts of a microprocessor system, like memories and a system clock are not shown.

A plurality of data items is stored in a memory, which data is used by the microprocessor 23 for determining the level of the interface between two media in the reservoir 1' from the momentary resonance frequency of the membrane 8. These data items are the resonance frequency of the membrane in dependence on the depth of immersion in the lower medium and the diameter of the membrane 8.

The apparatus as described can be used for different purposes, for example as a level detector. In that case the probe 2 can be mounted at a fixed level in the reservoir as schematically shown in FIG. 2. The positioning device 3 is not required in this case, however, it is preferred to use the positioning device 3 to obtain more applications of the apparatus according to the invention. When the reservoir is filled with a liquid, the resonance frequency of the membrane 8 will decrease as soon as the liquid contacts the membrane 8. This frequency decrease is detected by the microprocessor 23 and is signalled by providing a detection signal. The microprocessor can subsequently provide a signal to stop the filling operation of the reservoir.

Figure 7:
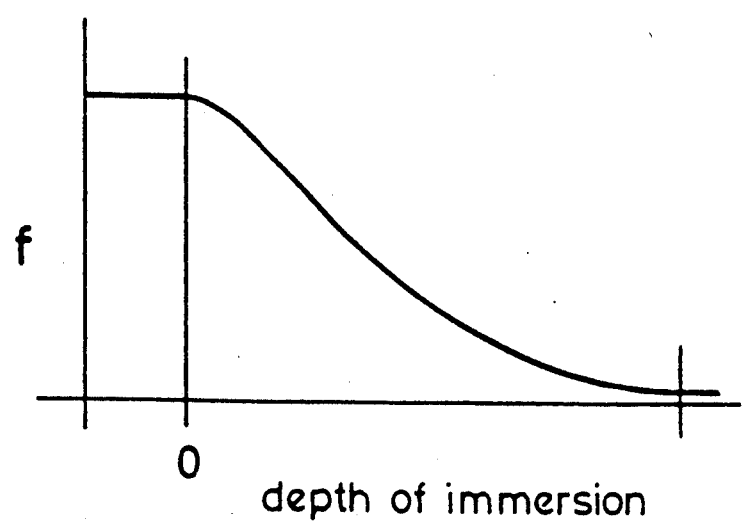
FIG. 7 shows a qualitative example of the dependency of the resonance frequency of the vibratory element on the depth of immersion.

Further the apparatus can be used as a level measuring apparatus in that the microprocessor 23 continuously controls the motor 6 in such a manner that the membrane 8 is maintained at the height of the liquid surface. The height of the liquid surface with respect to the membrane 8 directly follows from the resonance frequency of the membrane 8. FIG. 7 shows an example of the dependency of the resonance frequency of the membrane 8 on the depth of immersion of the membrane 8 in the liquid. Said height can be determined with high accuracy from the momentary resonance frequency of the membrane by means of usual arithmetic techniques by means of the above-mentioned parameters. The level of the liquid surface follows from the height with respect to the membrane 8 and the length of the cable 5 paid out.

Further the microprocessor 23 can control the positioning device 3 in such a manner that the membrane 8 is brought in a certain position at the height of the liquid surface. Subsequently the positioning device 3 is stopped. Thereafter the microprocessor 23 can monitor the resonance frequency of the membrane 8. From a change of this resonance frequency, which shows that the liquid level falls, can be derived that possibly somewhere in the reservoir leakage occurs, so that the microprocessor 23 may provide an alarm signal.

The microprocessor 23 can further control the positioning device 3 in such a manner that the membrane 8 is moved downwards through the liquid in the reservoir in order to determine the level of a possible interface between two different liquids, for example diesel oil and water. Due to the different densities of the non-mixing liquids the resonance frequency of the membrane will show a dependency corresponding to the dependency shown in FIG. 7 during passing this interface. From such a frequency change together with the length of the cable 5 paid out the level of such an interface between two liquids can be determined accurately.

During all measurements the processing unit 7 receives continuously the frequency signal of the oscillator 16 depending on the temperature at the location of the membrane 8, so that the microprocessor 23 can make a temperature compensation when determining the surface level.

In operation of the apparatus the surface of the membrane 8 may contaminate whereby the resonance frequency will be effected. In order to maintain the required accuracy, a correction procedure can be made, wherein the microprocessor 23 determines the resonance frequency of the membrane 8 when the membrane is fully in the first medium, for example air or gas, and when the membrane is fully in the second medium, for example gasoline, respectively. The resonance frequencies as determined in these two situations, are subsequently used for correcting the dependency of the resonance frequency on the depth of immersion as stored in the memory, which corrected function is used in further measurements.

It is noted that the membrane 8 can be made in different manners. Preferably the membrane consists of a metal plate to which piezo electric ceramic sheets are attached. It is also possible to make the membrane as a metal plate which is brought in a flectural vibration by electromagnetic means.

Further it is possible to mount the membrane 8 in the probe 2 in an oblique position. Thereby the sensitivity of the apparatus can be increased. In the embodiment of FIG. 3 the membrane 8 can even be mounted horizontally.

The invention is not restricted to the above described embodiments which can be varied within the scope of the claims in a number of ways.

I claim:

1. Apparatus for measuring the level of the interface between two different media in a reservoir comprising a vibratory element adapted to be contacted on all sides by both media and an amplifier circuit which together with the vibratory element forms an oscillator circuit in which the vibratory element is the frequency determining part, wherein the vibratory element makes flexural vibrations at a resonance frequency, and a processing unit connected to the oscillator circuit for measuring the momentary resonance frequency of the vibratory element and for deriving the level of the interface with respect to the vibratory element from said momentary resonance frequency by means of the predetermined dependency of the resonance frequency on the depth of immersion of the vibratory element in the lower medium, wherein the vibratory element is made as a plate-like element with a very small size with respect to the height of the reservoir and the vibratory element is connected to a positioning device controlled by the processing unit, said positioning device adapted to move the vibratory element along the whole height of the reservoir and to provide a position signal to the processing unit representing the height position of the vibratory element in the reservoir.

2. Apparatus according to claim 1, wherein the processing unit is adapted to control the positioning device in such a manner that the vibratory element follows the interface between both media.

3. Apparatus according to claim 1, wherein the processing unit is adapted to control the positioning device in such a manner that the vibratory element is moved into a position at the height of the interface between the first and second media, whereafter the positioning device is stopped in this position, and wherein the processing unit monitors the resonance frequency of the vibratory element and provides an alarm signal if the resonance frequency indicates a decline of the interface.

4. Apparatus according to claim 1, wherein the processing unit is adapted to control the positioning device in such a manner that the vibratory element is fully in the first medium and subsequently in the second medium, respectively, wherein the processing unit measures and stores the corresponding resonance frequencies of the vibratory element.

5. Apparatus according to claim 1, wherein a temperature sensor is mounted at the location of the vibratory element, which temperature sensor controls a temperature circuit supplying a signal depending on the temperature to the processing unit for making a temperature compensation at the level measurement of the interface.

* * * * *